UNITED STATES PATENT OFFICE.

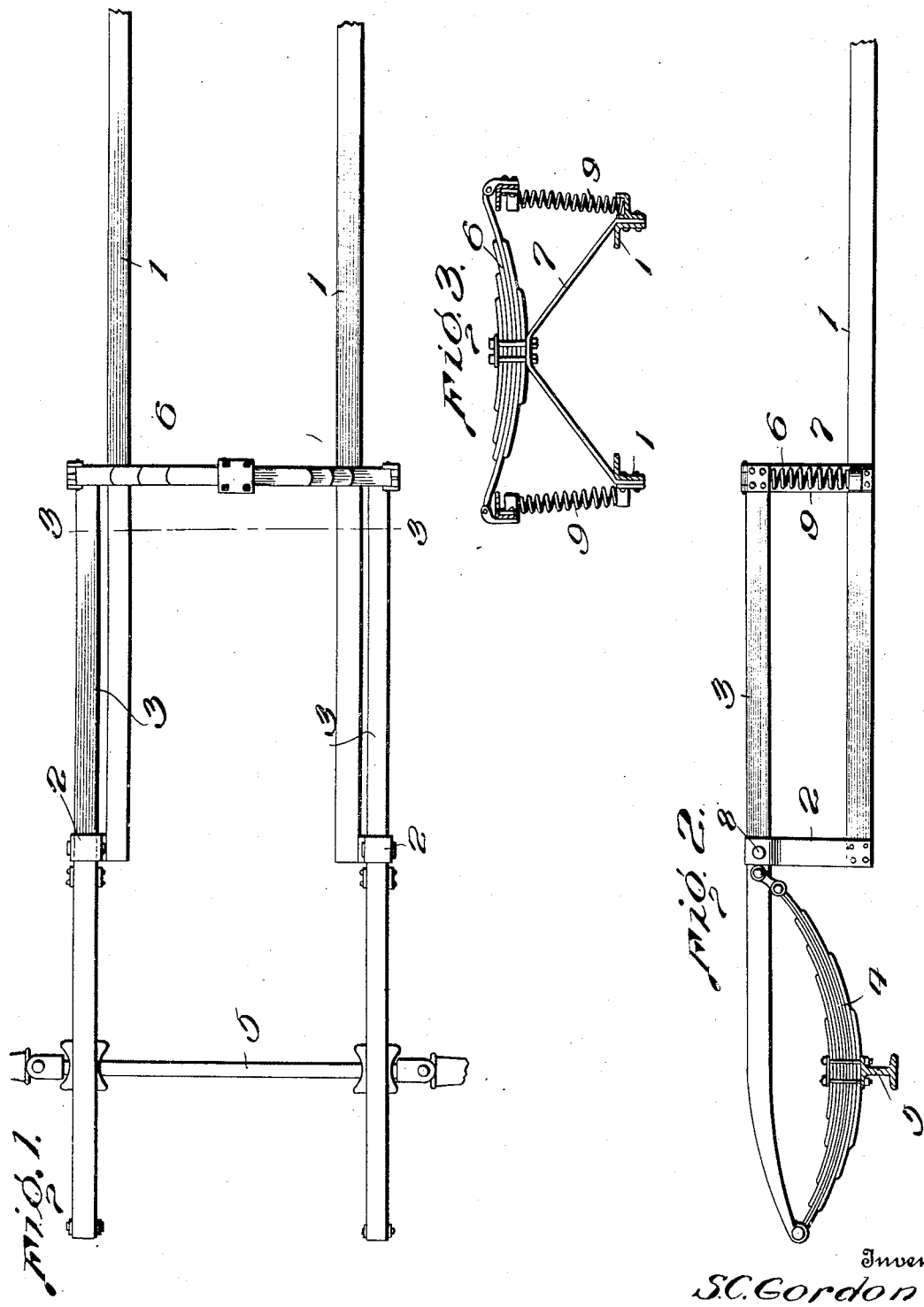

SAMUEL C. GORDON, OF RICHMOND, VIRGINIA.

AUTOMOBILE SPRING-FRAME.

1,205,526.  Specification of Letters Patent.  Patented Nov. 21, 1916.

Application filed July 24, 1915.  Serial No. 41,787.

*To all whom it may concern:*

Be it known that I, SAMUEL C. GORDON, a citizen of the United States, residing at Richmond, in the county of Henrico and State of Virginia, have invented certain new and useful Improvements in Automobile Spring-Frames, of which the following is a specification.

This invention relates to the supporting frames of vehicles, and has special reference to spring frames for automobiles.

The primary object of this invention is to provide a supporting frame for motor vehicles which will be easy riding and eliminate the shocks and jars which are now incident to the use of most of such vehicles.

A further object of the invention is to provide a supporting frame in which the center of gravity will be below the points of suspension so that sharp turns may be made safely and quickly.

Other incidental objects of the invention will appear as the description of the same proceeds, and the invention resides in certain novel features which will be particularly pointed out in the claims following the description.

The invention is illustrated in the accompanying drawings, in which:—

Figure 1 is a plan view of so much of an automobile frame as is necessary for a clear understanding of my improvements; Fig. 2 is a side elevation of the same; and Fig. 3 is a transverse section on the line 3—3 of Fig. 1.

In the drawings, the reference numeral 1 indicates the side bars of a main frame which carries the body of the vehicle together with the motor and the transmission gearing. To the ends of these side bars, I secure standards or brackets 2 which have supplemental side bars 3 pivoted to their upper ends. These supplemental side bars constitute the main portions of a supplemental frame, the front ends of these supplemental side bars being secured to the leaf springs 4 which are secured to the front axle 5 of the vehicle. The rear ends of the side bars 3 are connected by a transverse semi-elliptical spring 6, the intermediate portion of which is secured to the apex of an arch 7 having its ends secured to the side bars 1.

The front axle, spring and steering gear, it will be noted, are carried by the supplemental frame and, consequently, will not be affected by the movements of the main frame. When the steering wheels strike an obstruction, which tends to move the front end of the supplemental frame upwardly, the said frame will swing about its pivotal connection with the main frame and exert a downward pressure through its rear end which will tend to depress the main frame so that the body of the vehicle will remain approximately in the same horizontal plane at all times, and the comfort of the occupant of the vehicle will be promoted and jars and shocks to the motor and transmission gearing will be minimized.

It is to be particularly noted that the pivots or suspension points 8 by which the supplemental frame is secured to the main frame are above the center of gravity of the vehicle, so that, when the vehicle is turning a sharp corner, the tendency of the body to move in a straight line or swing outwardly will be counteracted and the lower portion of the body will tend to swing outwardly while the upper portion thereof will tend to swing inwardly, thereby exerting a downward pressure upon the inner wheels which will hold them to the road and consequently prevent overturning of the vehicle.

I have found it advantageous to employ supplemental coiled springs 9 which extend between the sides of the frame 1 and the inner ends of the frame 3. These springs increase the easy riding qualities of the car, particularly on a rough road at high speed.

My improved supporting frame is exceedingly simple in the construction and arrangement of its parts and may be substituted for the frames now in common use at a slight expense.

In practice, the vehicle mounted upon my improved frame will be found to possess superior riding qualities, and as the shocks and jars to which it is subjected are minimized, the life of the vehicle will be prolonged.

Having thus described the invention, what is claimed as new is:—

1. In a vehicle, the combination of a main frame, a supplemental frame pivotally mounted between its ends upon and above the front end of the main frame, an axle disposed below the front end of the supplemental frame, a spring connecting the axle with the front end of the supplemental frame, a spring having its ends secured to the rear end of the supplemental frame, and a rigid connection between the center of said spring and the main frame.

2. In a vehicle, the combination of a main frame, standards erected upon the outer end of the main frame, a rigid arch connecting the sides of the main frame in spaced relation to the end of the same, a supplemental frame pivoted between its ends to the upper ends of the said standards, an axle disposed below the front end of the supplemental frame, a spring connecting the axle with the supplemental frame, an elliptical spring disposed between and secured to the inner ends of the supplemental frame and having its central portion secured to the said rigid arch, and coil springs extending between the sides of the supplemental frame and the subjacent sides of the main frame.

In testimony whereof I affix my signature.

SAMUEL C. GORDON. [L. s.]